United States Patent [19]

Ho

[11] Patent Number: 4,710,887
[45] Date of Patent: Dec. 1, 1987

[54] COMPUTER CONTROLLED CONSTANT CONCENTRATION AND SIZE PARTICULATE GENERAL SYSTEM

[75] Inventor: Jim Y. W. Ho, Medicine Hat, Canada

[73] Assignee: Her Majesty the Queen in right of Canada, as represented by the Minister of National Defence, Ottawa, Canada

[21] Appl. No.: 745,167

[22] Filed: Jun. 17, 1985

[30] Foreign Application Priority Data

Aug. 21, 1984 [CA] Canada ................................... 461480

[51] Int. Cl.$^4$ ........................................... G01N 15/02
[52] U.S. Cl. ..................................... 364/555; 364/551; 356/336; 73/863.22
[58] Field of Search ...................... 364/555, 550, 551; 62/262, 268, 148, 276; 423/235, 242; 434/43; 356/336, 338, 439; 73/863.22, 28; 34/77

[56] References Cited

U.S. PATENT DOCUMENTS

| | | | |
|---|---|---|---|
| 3,938,348 | 2/1976 | Rickert | 62/262 |
| 4,211,090 | 6/1980 | Gelbard et al. | 62/276 |
| 4,211,487 | 7/1980 | Morrison et al. | 356/336 |
| 4,222,666 | 9/1980 | Tumanov et al. | 356/336 |
| 4,250,629 | 2/1981 | Lewis | 34/77 |
| 4,313,726 | 2/1982 | Chase | 434/43 |
| 4,419,879 | 12/1983 | Bush et al. | 364/555 |
| 4,488,248 | 12/1984 | Okada et al. | 364/555 |
| 4,568,190 | 2/1986 | Carlon et al. | 356/439 |

OTHER PUBLICATIONS

"A Microcomputer-Modified Particle Size Spectrometer" by Lewis et al, J. Aerosol Sci., vol. 9, No. 5, pp. 391-397, 1978.

Primary Examiner—Errol A. Krass
Assistant Examiner—V. N. Trans
Attorney, Agent, or Firm—Anthony T. Lane; Harold H. Card, Jr.; Michael C. Sachs

[57] ABSTRACT

An aerosol generating system for maintaining a constant concentration of aerosol in a chamber is disclosed. The system includes an aerosol generator in a closed chamber. A small fan in the chamber distributes the aerosol within the chamber. A particle analyzer connected to the chamber draws aerosol samples and analyses samples to monitor at least one characteristic property of the aerosol. Typically, these are particulate concentration and particulate size. The system includes a control responsive to signals from the analyzer representing changes in the monitored characteristic property to control operation of the aerosol generator. The control is such as to maintain the characteristic property substantially constant. The system may also be equipped with humidity and temperature control elements for maintaining these factors constant within the chamber.

3 Claims, 2 Drawing Figures

4,710,887

COMPUTER CONTROLLED CONSTANT CONCENTRATION AND SIZE PARTICULATE GENERAL SYSTEM

GOVERNMENTAL INTEREST

The invention described herein may be made, used or sold by the United States Government for governmental purposes without payment to me of any royalties therefor.

BACKGROUND AND FIELD OF THE INVENTION

The present invention relates to a system for generating a controlled aerosol in a chamber. The system is applicable for use in aerosol research and development work, including therapeutic and inhalation studies. It is also expected to find use in aerosol immunization and mass drug therapy applications.

When using aerosol in chambers, it is desirable to maintain a constant particulate concentration for extended periods of time. It is also desirable to be able to select a narrow size range for this control. All of these functions should be reproducible. The applicant is unaware of any existing system that would facilitate aerosol generation in a chamber under reproducible conditions.

SUMMARY OF THE INVENTION

According to the present invention, there is provided an aerosol generating system comprising:
(a) a closed chamber;
(b) an aerosol generator in the chamber;
(c) means for generating an air flow within the chamber to distribute aerosols therein;
(d) a particle analyzer connected to the chamber to draw aerosol samples therefrom and to monitor at least one characteristic property of the aerosol; and
(e) control means responsive to signals from the analyzer representative of chamber in the monitored characteristic property to control operation of the aerosol generator so as to maintain the charcteristic property substantially constant.

Preferably, the chamber is equipped with a climate control system, preferably automatic, for controlling the temperature and humidity in the chamber. The analyzer and control means may serve to monitor particle size, particle concentration or both. It may allow for the selection of sampling time and the number of sampling cycles. A small, general purpose computer appropriately programmed ideally serves this purpose.

BRIEF DESCRIPTION OF THE DRAWINGS

In the accompanying drawings, which illustrate an exemplary embodiment of the present invention.

DESCRIPTION OF A PREFERRED EMBODIMENT OF THE INVENTION

Figure 1:
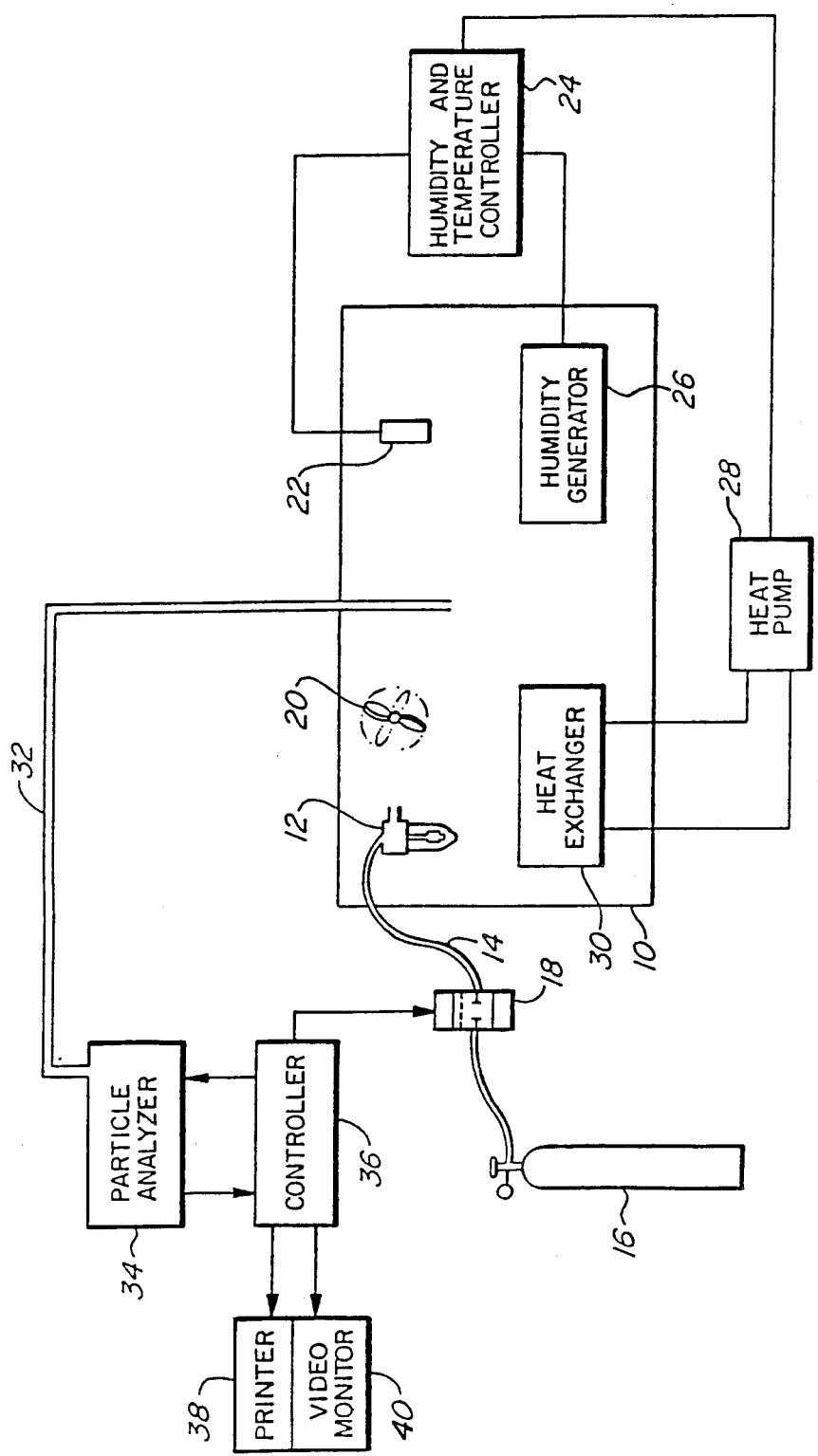
FIG. 1 is a schematic of an aerosol generation system.

Referring to the drawings, and particularly to FIG. 1, there is illustrated an aerosol generation system. The system includes a closed chamber 10 in which an aerosol is generated by a Collision nebulizer 12. The nebulizer is driven by compressed nitrogen delivered through a line 14 from a bottle 16.

Operation of the aerosol generator is controlled by controlling the nitrogen flow through line 14 with a solenoid valve 18.

Housed within the chamber 10 is a small electric fan 20. This serves to distribute the aerosol within the chamber.

A humidity and temperature sensor 22 is mounted within the chamber 10. It is connected to the humidity and temperature controller 24 outside of the chamber. Both of these elements are manufactured by Phys-Chemical Research Corporation of New York, N.Y. U.S.A. The sensor is designated PCRC-11-T-B while the controller is the "Humitemp 2 Model B controller".

The controller 24 is connected to a humidity generator 26 inside the chamber 10. This is Model 202 Microsol Mechanical Aerosol Fog Generator of Silver Creek Precision Corporation, Silver Creek, N.Y., U.S.A. The controller is also connected to a reversible heat pump 28 pumping liquid at a controlled temperature into a heat exchanger 30 in the chamber 10. The controller 24 controls the operation of the humidity and heat elements 26 and 28 to maintain constant humidity and temperature conditions inside the chamber 10.

An aerosol sampling line 32 projects into the chamber 10 and is connected to a particle analyzer 34. This is a commercial item designated Model APS 3300 from TSI Incorporation of St. Paul, Minn., U.S.A. The particle analyzer is in turn connected to a controller 36 which is an Apple II (TM) computer. The controller operates a printer 38 and a video monitor 40 which provide a readout of the aerosol characteristics determined by the particle analyzer 34. The controller is also connected to the solenoid 18 to open and close the gas line 14 thus modulating operation of the aerosol generator 12.

The particle analyzer 34 may be controlled by the controller 36 to monitor either particle size or particle concentration. The controller 36 is also operable to set the sampling time and the number of sampling cycles so that the operation of the system is fully automatic.

Figure 2:
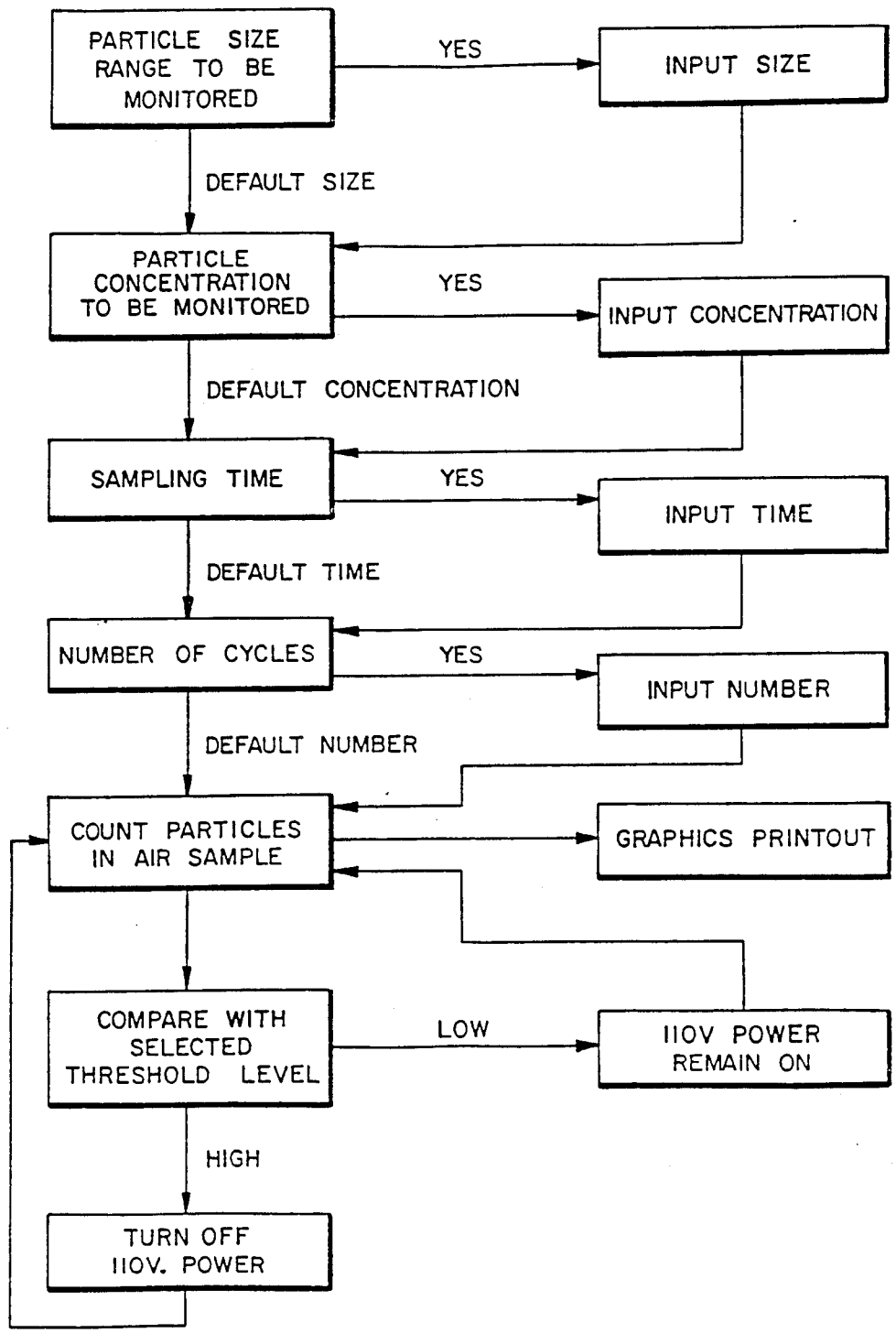
FIG. 2 is a control program in flow chart format for the system of FIG. 1.

FIG. 2 of the drawings illustrates the program for the controller 36 in block form. As illustrated, the operator has the initial option to select the aerosol particle size, the particle concentration, the sampling time and the number of cycles. This allows a considerable degree of freedom in determining the conditions for any particular use of the system. After the parameters have been selected, the system proceeds to analyze a sample or a sequence of samples according to the input and to provide a graphics printout showing the results of the analysis. The measured parameters (concentration, size) are compared with the preselected levels. If the measured levels are low, the solenoid valve 18 is kept open or opened to increase the aerosol particulates to the desired levels. Otherwise, the valve is closed or maintained closed.

With the system as thus described, it takes about thirty seconds for a control command to be generated. This relatively long time is due to the large amounts of data to be processed for each size and concentration determination. This time can be shortened by installing a special circuit board commercially available from Saturn Technology of Ann Arbor, Mich., U.S.A. to increase the computer speed by a factor 3. This will improve the system resolution to ten second updates to provide a finer control of the particle concentration.

The system as described allows reproducible conditions to be achieved in an aerosol generating system. The ability to select for the particular concentration range as a factor to be maintained constant makes the system useful for therapeutic and inhalation studies. It is to be understood that the size of the chamber may be tailored to a particular need.

In other embodiments of the system, the performance might be upgraded to include real time analysis of a different aerosol sample while controlling the concentration of the original. Substituting a microcomputer with more memory and speed than the Apple II as the controller will permit the performance of more functions within a given time. Special programs may also be incorporated to allow for alternate analysis and control functions together with graphics output and data storage. It is also possible to incorporate a transistor-transistor logic (TTL) control valve for alternate aerosol sources.

The embodiments of the invention in which an exclusive property or privilege is claimed are defined as follows:

1. An aerosol generating system comprising:
   (a) a closed chamber;
   (b) an aerosol generator in the chamber;
   (c) means for generating an air flow within the chamber to distribute aerosols therein;
   (d) a particle analyzer connected to the chamber to draw aerosol samples therefrom and to monitor particle size range of the aerosol; and
   (e) control means responsive to signals from the analyzer representative of changes in said particle size range to control operation of the aerosol generator so as to maintain said particle size substantially constant.

2. An aerosol generating system comprising:
   (a) a closed chamber;
   (b) an aerosol generator in the chamber;
   (c) means for generating an air flow within the chamber to distribute aerosols therein;
   (d) a particle analyzer connected to the chamber to draw aerosol samples therefrom and to monitor particle concentration of the aerosol; and
   (e) control means responsive to signals from the analyzer representative of changes in said particle concentration to control operation of the aerosol generator so as to maintain said particle concentration substantially constant.

3. An aerosol generating system comprising:
   (a) a closed chamber;
   (b) an aerosol generator in the chamber including climate control means for maintaining both the temperature and humidity in the chamber substantially constant;
   (c) means for generating an air flow within the chamber to distribute aerosols therein;
   (d) a particle analyzer connected to the chamber to draw aerosol samples therefrom and to monitor the particle concentration property of the aerosol; and
   (e) control means responsive to signals from the analyzer representative of changes in the monitored particle concentration to control operation of the aerosol generator so as to maintain said particle concentration property substantially constant.

* * * * *